United States Patent [19]

Warchol

[11] Patent Number: 5,595,406
[45] Date of Patent: Jan. 21, 1997

[54] CAPILLARY TUBING CONNECTOR

[75] Inventor: Andrew M. E. Warchol, Wilmington, Del.

[73] Assignee: Hewlett-Packard Co., Palo Alto, Calif.

[21] Appl. No.: 568,893

[22] Filed: Nov. 30, 1995

[51] Int. Cl.⁶ ................................. F16L 39/00
[52] U.S. Cl. ............... 285/319; 285/334.4; 285/341; 285/375; 285/422; 285/911; 285/921
[58] Field of Search ..................... 285/375, 319, 285/921, 334.4, 267, 268, 269, 279, 911, 422

[56] References Cited

U.S. PATENT DOCUMENTS

| | | | |
|---|---|---|---|
| 921,691 | 5/1909 | Friday | 285/375 X |
| 2,529,821 | 11/1950 | Snider | 285/375 X |
| 4,787,656 | 11/1988 | Ryder . | |
| 4,941,689 | 7/1990 | Sjoberg | 285/319 X |
| 4,991,883 | 2/1991 | Worden . | |
| 5,143,410 | 9/1992 | Takikawa | 285/334.4 X |
| 5,163,215 | 2/1992 | Ledford, Jr. . | |
| 5,163,722 | 11/1992 | Worden . | |
| 5,172,939 | 12/1992 | Hashimoto . | |
| 5,192,095 | 3/1993 | Behrens . | |
| 5,207,460 | 5/1993 | Oetiker . | |
| 5,234,235 | 8/1993 | Worden . | |
| 5,236,668 | 8/1993 | Higdon . | |
| 5,261,240 | 11/1993 | Oyler et al. . | |
| 5,332,267 | 7/1994 | Harrison . | |
| 5,350,200 | 9/1994 | Peterson et al. . | |
| 5,423,581 | 6/1995 | Salyers . | |

FOREIGN PATENT DOCUMENTS 2648384  6/1977  Germany ............................. 285/319

*Primary Examiner*—Dave W. Arola
*Attorney, Agent, or Firm*—Mark Z. Dudley

[57] ABSTRACT

A connector for connecting a first fluid-bearing conduit to a second fluid-bearing conduit, thereby providing a substantially leak-free fluid communication between the first and second fluid-bearing conduits. The second fluid-bearing conduit is located in a receiver and communicates with a receiving port. A frustoconical surface on the receiver defines the receiving port. The connector includes a support, a biferrule, and a biferrule compression assembly. The biferrule is provided with a forward end having a spherical head portion, an aft end having a frustoconical tapered portion, and a bore therebetween for receiving the first fluid-bearing conduit. The biferrule compression assembly includes a compression collar, a support for supporting the biferrule, and biasing means to a) compress the compression collar on the aft end of the biferrule to engage a first fluid seal that is preferably reversible, between the aft end of the biferrule and the first conduit, and b) urge the forward end of the biferrule into a second fluid seal with the frustoconical surface on the a receiving port. The spherical head portion is circular when viewed in transverse cross section such that when the forward end of the biferrule is urged onto the receiver port by the biasing means, the biferrule will engage the frustoconical surface in a substantially circular line contact.

8 Claims, 2 Drawing Sheets

CAPILLARY TUBING CONNECTOR

FIELD OF THE INVENTION

The present invention relates to methods and apparatus for coupling a fluid stream in a first fluid-bearing conduit to a second fluid-bearing conduit.

BACKGROUND OF THE INVENTION

Connectors are known in the art for receiving a fluid stream in a first fluid-bearing conduit and then delivering the received fluid stream to a second fluid-bearing conduit. In many cases, the fluid connection is obtained by manual alignment and coupling of separate components that comprise the connector, such as by alignment and compression of a sealing device onto a tubular device while being fitted to a receiving fitting.

The sealing device on conventional connectors is typically a ferrule having a conical frustrum exterior and a through hole. The tubular device is inserted into the through hole and the tubular device/ferrule assembly is then inserted into a receiving feature which is shaped as a complementary conical frustrum. The receiving feature is referred to as the ferrule seat. The tubular device/ferrule assembly is then forced into the ferrule seat via pressure applied by a threaded fastener.

Such an approach has several disadvantages. To effect a reliable, fluid-tight seal, the leading edge of the exterior of the ferrule must be properly oriented to the ferrule seat, which occurs only if the central axes of the ferrule and ferrule seat are perfectly coincident; both the ferrule and the ferrule seat must be fabricated to be perfectly circular; and the diameter of the through hole in the ferrule must be uniformly and adequately compressed to effect a seal between the surface of the through hole and the exterior surface of the column.

The connector and tubular device may be subject to extended periods in a variable temperature environment. For example, in gas chromatography, a connector may be employed on a tubular device in the form of a capillary column to couple a fluid stream in the column to certain devices (such as a detector) in a chromatographic apparatus. The column may be located in a convection oven wherein the temperature environment ranges from minus 70 degrees C. to 450 degrees C. Conventional connectors, when used in such an environment, are subject to expansion and contraction. As a result, the connection fails and the connector is subject to leakage. The results of such a failure include: degradation of the column via oxidation; poor quantition due to inaccurate measurement of column flow; interference effects of air at the detector; and degradation of analytes in the fluid stream as they react with the atmosphere.

One conventional approach to resolving the foregoing difficulties includes a practice of fabricating the ferrule from a compliant material. A large insertion force is then used to force the ferrule into the ferrule seat, thus causing the ferrule to conform both to the shape of the ferrule seat and to the exterior of the capillary tubing. The drawback to this approach is that a high stress is induced in the ferrule by such compression. Further, a high temperature environment will often cause such ferrule material to creep or fracture, thereby creating a fluid leak.

Another approach is to use ferrules and ferrule seats that each have a small included angle; however, a problem arises in that such a ferrule/seat combination is prone to fracture or retention (jamming) of the ferrule in the ferrule seat. Neither the ferrule nor the ferrule/seat combination is easily replaced. Thus, a routine column removal, replacement, or installation task becomes an expensive and time-consuming process.

Still another approach is to encapsulate the ferrule material in a rigid container to comprise a ferrule assembly; however, such a ferrule assembly, when subjected to extremes in temperature, appears to suffer from thermally-induced mechanical creep, which can cause a leak.

One other approach is to utilize a spring-loaded ferrule (see, e.g., U.S. Pat. No. 5,163,215) so as to compensate for thermally-induced mechanical creep. This approach has the potential to prevent failures that are due to creep-induced leaks. However, conventional apparatus have not been entirely successful because the spring, which is typically formed of metal, is subject to relaxation and annealing in a high temperature environment. Also, the conventional ferrule requires a high spring force to achieve an adequate seal, which necessitates the use of a large spring and various other parts to provide a spring assembly. Such an assembly has sufficient thermal mass that it exhibits a large heat capacity. The spring-loaded ferrule assembly then becomes an unwanted, localized thermal sink (known as a "cold spot") when positioned in a variable temperature environment. An alternative spring material, such as quartz (see, e.g., U.S. Pat. No. 4,991,883) is less subject to temperature-induced creep but still exhibits a relatively large thermal mass.

There remains a practical need for a simple, reliable, and inexpensive apparatus for receiving a fluid stream in a fluid-bearing conduit and delivering the fluid stream into a fluid flow system without incurring leaks or other failures. This need is especially apparent in connecting one or more fluid streams in an apparatus for performing high-resolution chromatography. Further, there is a need for a simple, reliable, and inexpensive apparatus for removing, replacing, or reinstalling such a fluid-bearing conduit with respect to the fluid flow system.

SUMMARY OF THE INVENTION

The present invention provides a connector for connecting a first fluid-bearing conduit to a second fluid-bearing conduit, thereby providing a substantially leak-free fluid communication between the first and second fluid-bearing conduits. The second fluid-bearing conduit is located in a receiver and communicates with a receiving port. A frustoconical surface on the receiver defines the receiving port.

Accordingly, a preferred embodiment of a fluid connector for coupling a first fluid-bearing conduit to a second fluid-bearing conduit situated in a receiver includes a support, a biferrule, and a biferrule compression assembly. The biferrule is provided with a forward end having a spherical head portion, an aft end having a frustoconical tapered portion, and a bore therebetween for receiving the first fluid-bearing conduit. The biferrule compression assembly includes a compression collar, a support for supporting the biferrule, and biasing means to a) compress the compression collar on the aft end of the biferrule to engage a first fluid seal that is preferably reversible, between the aft end of the biferrule and the first conduit, and b) urge the forward end of the biferrule into a second fluid seal with the frustoconical surface on the a receiving port. The spherical head portion is circular when viewed in transverse cross section such that when the forward end of the biferrule is urged onto the receiver port by the biasing means, the biferrule will engage the frustoconical surface in a substantially circular line contact.

The aforementioned embodiment of a connector is preferably employed for connecting capillary tubing to a receiver situated in a sample analysis system. The connector thus employed will enable analysis of the constituent components of a sample fluid carried in the capillary tubing.

DETAILED DESCRIPTION OF THE INVENTION

Figure 1:
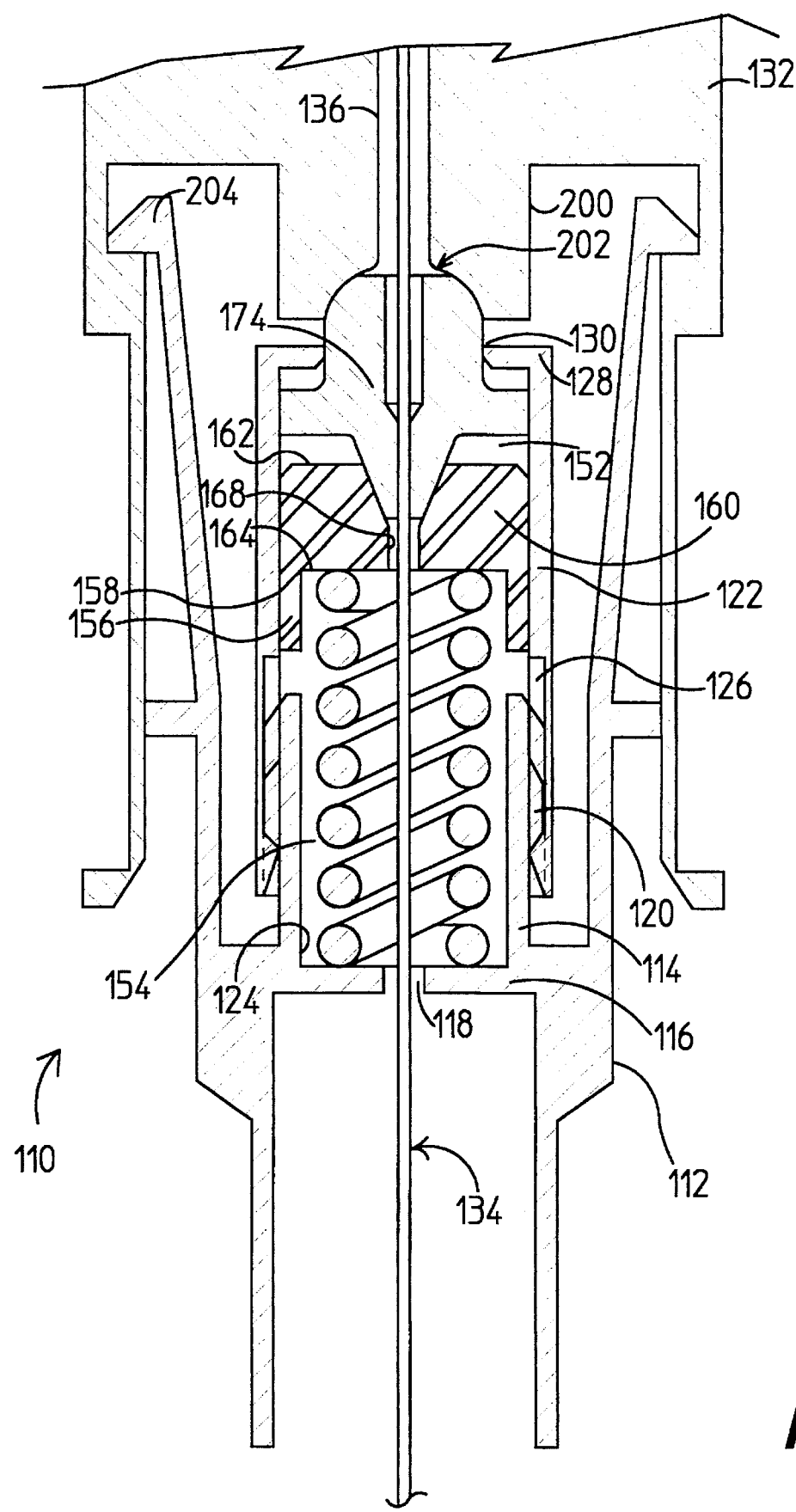
FIG. 1 is a side sectional view of the capillary tubing connector of the present invention.

The present invention will find useful application in a variety of fluid handling systems that benefit from the delivery or connection of a discrete or continuous flow of a fluid stream. Such fluid handling systems are especially employed in a wide variety of analytical applications, such as sample extraction, purification, and analysis; clinical assay and analysis; industrial processing; and reagent dispensing. Further examples of instruments that are particularly benefited by an application of the present invention include instruments for performing gas, liquid, or supercritical fluid chromatography. In particular, the preferred embodiment is especially suited for connecting capillary tubing to a fluid receiver in a gas or liquid chromatograph.

The contemplated fluid connector constructed according to the present invention is advantageously employed for easily and releasably connecting the first fluid-bearing conduit in fluid-tight communication to a second fluid-bearing conduit situated in a connector receiver fitting (termed hereinafter as a receiver.). The fluid connector provides an improved means for connecting the first fluid-bearing conduit to the second fluid-bearing conduit for leak-free operation in a high temperature environment. (For example, leak-free operation is considered to describe sufficient connector integrity and fluid sealing such that helium present in the conduits at a pressure of 1 bar would experience no more than approximately 0.0001 sccm (standard cubic centimeters per minute) leakage. Disassembly of the fluid-bearing conduit from the receiver may be performed easily and without damage to the first or second fluid-bearing conduits, and without other failure modes that otherwise would occur due to the effects of the connection or the temperature environment.

The preferred embodiment of a fluid connector features a novel ferrule design, termed herein a "biferrule", which includes at least two distinct features: a first sealing means for effecting a fluid-tight seal between the first fluid-bearing conduit and an internal fluid-bearing bore within the biferrule, and a second sealing means for effecting a fluid-tight seal between the internal fluid-bearing bore and the second fluid-bearing conduit in the receiver.

In particular, the internal bore of the ferrule is provided with a conical egress to allow the first fluid-bearing conduit to be guided into the internal bore of the biferrule. The exterior of the biferrule features a spherical sealing surface on a forward end that is adapted for engaging the receiver, and an exterior surface shaped as a conical frustrum of small included angle on the opposing, aft end. The aft end of the biferrule is adapted for interfacing with an inexpensive compression collar which has a conical aperture of small included angle. Both the biferrule and the compression collar are simple and inexpensive to construct and therefore are disposable. The ferrule/collar assembly is easily aligned with, and loaded against, a frustoconical receiving surface in the receiver. The frustoconical receiving surface offers a conical egress having a large included angle. Accordingly, a small, low-force spring may be used to maintain sealing contact of the spherical sealing surface on the frustoconical receiving surface in the receiver. A reliable fluid seal is maintained at a low spring force and without further adjustment or tightening of the ferrule/collar assembly. The spring therefore exhibits less thermal mass than the devices used for effecting a sealing function in the prior art.

Accordingly, FIG. 1 illustrates a fluid connector constructed in the form of a connector assembly 110 especially suited for connecting a fluid stream within a sample analysis system operable for accomplishing a chromatographic separation and detection of various components in a sample present in the fluid stream. The illustrated connector assembly 110 is contemplated for use in connecting a first fluid-bearing conduit in the form of an open tubular or open capillary silica column 134 to a receiver 132 that may be fitted or integrated with a second fluid-bearing conduit in the form of a channel 136. The connector assembly 110 includes a support 112 having a cylindrical wall 114 and an end wall 116 with a centrally disposed aperture 118 therein. The wall 114 is provided with tabs 120 for receiving, aligning, and retaining thereon a cylindrical body 122.

The body 122 has a generally cylindrical wall 124 provided with grooves 126 which mate with the tabs 120 on the support 112, so as to allow the support 112 to slidably engage the body 122. The body 122 further includes an internal flange 128 which has a generally centrally disposed, cylindrical bore 130 therethrough.

The wall 124 defines a generally cylindrical cavity 152 wherein a compression spring 154 and a compression collar 156 are slidably disposed within the interior surface of the wall 124. The compression collar 156 includes a first generally cylindrical portion 158, an intermediate, inwardly radial, annular flange 160 and a second generally cylindrical portion 162. The portion 162 has a conical passageway 168 having an inward taper that is adapted to fit onto a portion of the biferrule 174 as will be described below. Flange 160 forms an annularly extending shoulder 164. As shown, the spring 154 is situated between the end wall 116 of the support 112 and the annular shoulder 164 of compression collar 156. Accordingly, the spring 154 will act to urge compression collar 156 away from end wall 116. A passageway 168 extends through compression collar 156. One end of the passageway 168 forms an opening which is generally centrally disposed with respect to the flange 160. The column 134 may be inserted through the aperture 118, spring 154, and passageway 168 so as to communicate with an internal bore 184 in a biferrule 174. The column 134 may, if the channel 136 so accommodates, project beyond the biferrule 174 so as to enter the channel 136.

Figure 2:
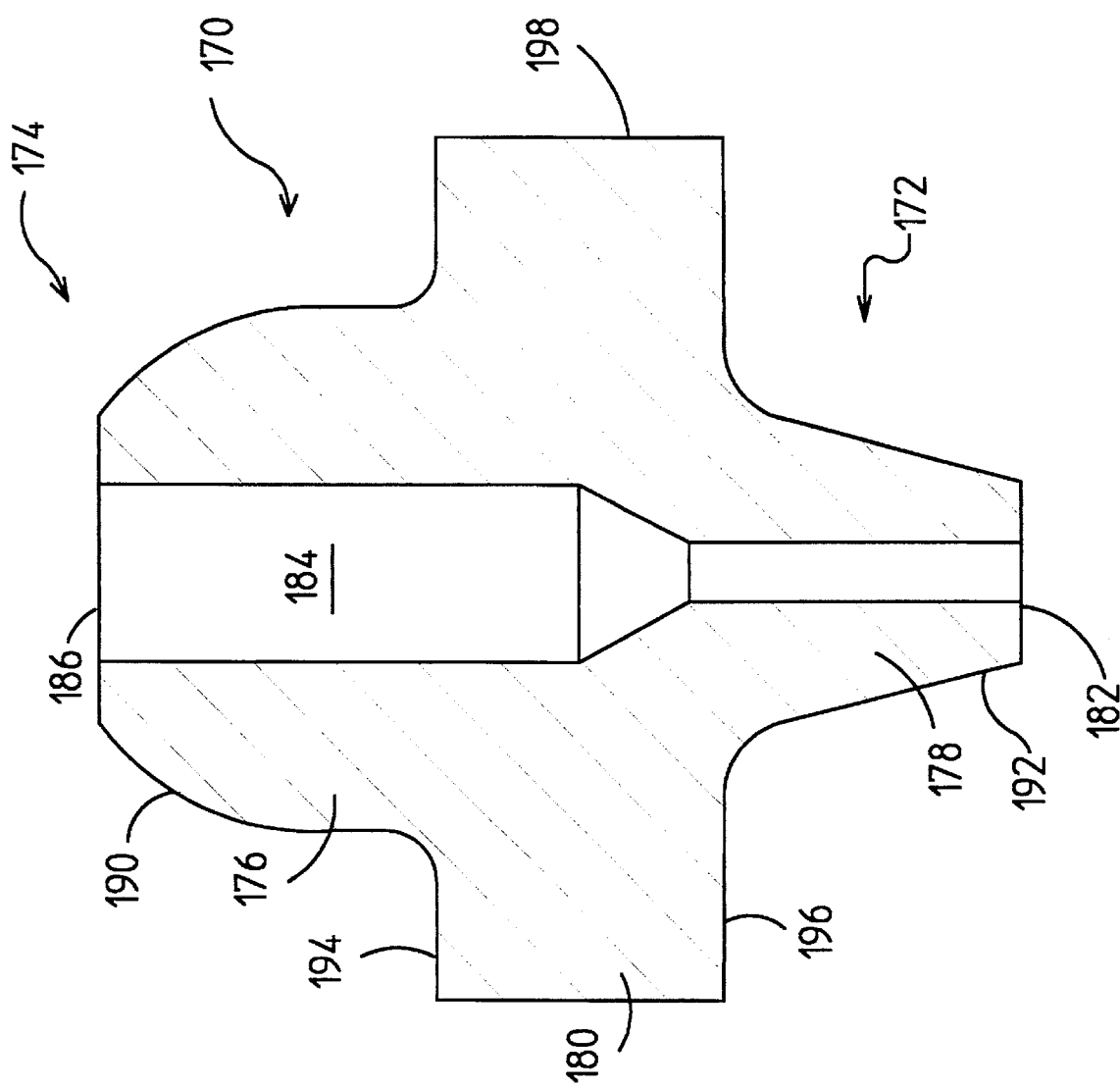
FIG. 2 is a side sectional view of a biferrule employed in the capillary tubing connector of FIG. 1, enlarged for clarity.

With reference also to FIG. 2, the biferrule 174 will be seen to include a forward end 170 having a spherical head portion 176, an aft end 172 having a frustoconical tapered portion 178, and a cylindrical neck portion 180 therebetween. It can thus be seen that the neck 180 is located between the spherical head portion 176 and the frustoconical tapered portion 178 for slidable coaxial alignment within the support 112. The biferrule includes a central bore 184 that communicates between the center of an aft transverse surface 182 and the center of a forward transverse surface 186. However, the majority of the spherical head portion 176 is defined by a spherical surface 190. Similarly, the majority of the frustoconical tapered portion is defined by a frustoconical surface 192. The neck 180 includes a forward shoulder 194, an aft shoulder 194, and a generally cylindrical surface 198 therebetween to allow slidable contact within the interior of the wall 124. The section of the bore 184 in the frustoconical tapered portion 178 has an internal bore diameter substantially equal to, or slightly larger than, the largest diameter of the column 134 such that inward compression of the frustoconical tapered portion 178 effects a fluid-tight seal therebetween.

To assemble the connector 110, a compression assembly is provided by coaxially aligning the support 112, spring 154, and compression collar 156 in the cylindrical cavity 152 formed by the wall 114 and body 122. The column 134 is then fed through the opening 118 and the passageway 168 with an end portion being fitted within the biferrule 174. The body 122 is then slidably engaged over the biferrule 174 and onto the exterior of wall 114 so as to be mounted on the support 112. The spring 154, compression collar 158, and biferrule 174 are thus retained in the connector 110 by means of the flange 128 which acts as a mechanical stop. The compression assembly is then retained by the body 122 on the support 112 by engagement of the tabs 120 with depressions, grooves, or other suitable retaining means in the exterior of the wall 114. The assembled connector 110 is then made to engage the receiver 132 by suitable means such as a deformable snap mount 204.

Because of the biasing action of spring 154, the compression collar 158 is urged in a direction away from end wall 116 and toward flange 128, which results in: a) transmission of the biasing force through the compression collar 156 thus causing the passageway 168 onto the frustoconical tapered portion 178; b) generally coaxial alignment of the biferrule 174 with the channel 136; and c) engagement of the spherical surface 190 with the receiver port surface 202. The biasing force accomplishes two sealing functions at once: Firstly, the internal surface of the bore 184 in the frustoconical tapered portion 178 is compressed onto the exterior of the column 134, thus causing a fluid-tight seal between the column 134 and the biferrule 174. Secondly, the spherical surface 190 of the spherical head portion 176 conforms with the receiver port surface 202, thus causing a fluid-tight seal between the biferrule 174 and the channel 136.

Note that the diameter of the neck portion 180 is larger than the bore 130, and the spherical head portion 176 is larger than the diameter of the smallest inverted frustoconical portion defined by a receiver port surface 202. Accordingly, when biferrule 174 is urged forward within the body 122 such that the spherical surface 190 meets the receiver port surface 202, a circular segment of the spherical head portion 176 engages the receiver port surface 202. This engagement will result in a circular line contact between the spherical surface 190 and the receiver port surface 202.

In contrast to prior art ferrules and ferrule seats, which are typically of frustoconical and/or cylindrical shapes, the spherical head portion 176 is bulbous when viewed in transverse cross section so as to ensure complete but reversible line contact between the biferrule 176 and the receiver port surface 202. It will be appreciated that in order to achieve the circular line contact desired between the biferrule 174 and the receiver port surface 202, the latter is preferably formed to define a large included angle that is sufficiently complementary to the radius of the spherical portion 174.

Because of the biasing action of spring 154, the expansion and/or contraction of the biferrule 174 and receiver 132 during ambient temperature fluctuations does not impair the sealing engagement of the biferrule 174 with receiver port surface 202. Nonetheless, the engagement or disengagement of the fluid-tight seal between biferrule 174 and receiver port surface 202 is enhanced by the ease with which the spherical portion of the biferrule 174 can interface with the receiver port surface 202, particularly when the central axis of the connector 110 (which typically is coaxial with the central axis of the biferrule 174) is not coaxially aligned with the central axis of the receiver port 200.

The connector 110 thus provides a means to provide fluid-tight communication between a capillary tube and a fluid-bearing conduit in a receiver, i.e., between the column 134 and the channel 136. The fluid-tight seal is maintained even when subject to temperature extremes because the biasing action of the spring 154 will maintain the biferrule 174 in contact with the receiver 132 while accommodating the expansion and contraction of the biferrule 174 and the receiver 132.

While the biasing means is shown as a spring 154, it will be recognized that other means of biasing the compression collar 156 can be employed, such as one or more flexural members; helical coils; corrugated leaves; resilient cylinders, pads, or toroids; etc. Use of a spring 154 formed of quartz or similar material has particular advantage when the connector is to be used in very high temperature environments where metallic springs might yield or fail.

The provision of substantial line contact sealing between the biferrule 174 and the receiver port surface 202 obviates the necessity, often seen in the prior art, for machining parts to extremely close tolerances in an attempt to achieve mated, gas-tight engagement between relatively large contact surfaces.

The components of the connector 110 can be fabricated from a variety of materials. The biferrule 174 is preferably made of a ductile material that exhibits at least some capacity for deformation at a minimum or, more preferably, some elasticity. The term "ductile" as used herein refers to a material which, under compression, deforms to the extent necessary to achieve engagement between the bore 184 in the frustoconical tapered portion 178 and the column 134, and between the spherical surface 190 and the receiver port surface 202. Suitable materials for use in forming the biferrule 174 include polyamide, polyimides and various other polymeric materials which need not considered to be elastic but are deformable as that term is used above. It is also preferred that the components of the connector 110, and especially the compression collar 156 and biferrule 174, be formed of inexpensive (hence disposable), inert, thermally-stable materials, such as an organic polymer; exemplary inert polymers are polyimides, aramid polymers, acetal resins, and poly(tetrafluoroethylene) such as available from the DuPont Company (Wilmington, Del.) under the trade names Vespel, Kevlar, Delrin, and Teflon, respectively; and poly(chlorotrifluoroethylene), such as available from the 3M Company (Newark, N.J.) under the trade name Kel-F.

The means for attachment of the connector 110 to the receiver 132 may differ than as shown. For example, the engagement of the tabs 120 in the body 122 and/or the snap lock 204 effected between support 112 and receiver 132 could be replaced or augmented with a differing type of retention device, or by a threaded, socketed, or friction-fitting retaining device(s) of differing construction. Preferably, the attachment should be made reversible or releasable so as to allow the connector 110 to be removed from the receiver 132 and disassembled for servicing or replacement of the connector 110 or the column 134.

The biferrule 174 will make a reliable fluid-tight seal even after experiencing wide variations in the temperature environment and during conditions of low compression (sealing) force, angular misalignment, and/or variations in the included angle of the receiver port surface 202. A spring 154 and mounting hardware having smaller volume and lower mass can be used, thus reducing or eliminating the thermal capacity problem exhibited by the spring-loaded designs in the prior art.

The small included angle on the frustoconical tapered portion 178 allows an adequate seal to be made between the biferrule 174, compression collar 156, and the column 134 with use of less insertion force than the assembly or sealing forces encountered in prior art fluid connectors. Assembly and disassembly of the connector is thus reliable and easy. Nonetheless, should the biferrule 174 and compression collar 156 become jammed together (i.e., nearly or completely inseparable), they may be easily removed from the connector 110 with the column 134 still attached. The column 134 is then cut at a point adjacent the combination of the biferrule 174 and compression collar 156, and the tubing fragment, biferrule 174, and compression collar 156 are then discarded. A new biferrule 174 and new compression collar 156 may then be easily and inexpensively employed to re-establish a fluid-tight connection.

The advantages of the foregoing capabilities for servicing or replacement of the connector 110 will distinguish it as a low-cost, effective device for effecting fluid tight connections.

As described in the foregoing, the connector 110 of the present invention is preferred for the delivery of fluid stream in a capillary column 134 to one or more channels 136 in sample analysis system. However, the contemplated connector 110 will find application for the delivery of a fluid stream to or from differing or additional components that may be present in the sample analysis system, or in other fluid handling systems. For example, the contemplated fluid connection for delivery of a fluid stream is not limited to only a column 134. It will be appreciated that the connector 110 may be fitted to other components such as tubular fittings, piping, tubing, needles, canulas, drains, nipples, and other apparatus or devices. While such systems are not shown in the Figures, they are contemplated as being amenable to use with the present invention.

Although the invention has been described with reference to the above-described preferred embodiments, variations and modifications are contemplated as being within the scope and spirit of the present invention.

What is claimed is:

1. A connector for connecting a first fluid-bearing conduit to a second fluid-bearing conduit, thereby providing fluid communication between the first and second fluid-bearing conduits, the second fluid-bearing conduit being located in a receiver and communicating with a receiver port having a receiver port surface, comprising:

a biferrule provided with a forward end having a spherical head portion, an aft end having a tapered portion, and a bore therebetween for receiving the first fluid-bearing conduit therein;

a biferrule compression assembly including a support for supporting the biferrule in the biferrule compression assembly, biasing means for compressing the aft end of the biferrule onto the first conduit, and means for attaching the combination of the biferrule, support, and biasing means to the receiver, said combination being attachable to the receiver to cause said biasing means to compress the aft end of the biferrule onto the first conduit for effecting a first fluid seal therebetween and to urge the forward end of the biferrule into sealing engagement with the receiving port for effecting a second fluid seal therebetween.

2. The connector of claim 1, wherein the spherical head portion is circular when viewed in transverse cross section and the receiver port surface is frustoconical such that the spherical surface engages the frustoconical surface in a substantially circular line contact.

3. The connector of claim 1, wherein the tapered portion of the biferrule is frustoconical.

4. The connector of claim 1, wherein the biferrule compression assembly includes a body releasably attachable to the support, said biferrule and biasing means being located within the body.

5. The connector of claim 4, wherein the biferrule compression assembly includes a compression collar slidably engaged in the body for transferring the biasing force from the biasing means to the tapered portion.

6. The connector of claim 5, wherein the biasing means is constructed in the form of a spring.

7. The connector of claim 1, wherein the biferrule compression assembly includes first mounting means for assembly and disassembly of the biferrule and biasing means.

8. The connector of claim 1, wherein the biferrule compression assembly includes second mounting means for releasably orienting and releasably attaching the connector with respect to the receiver.

\* \* \* \* \*